United States Patent
Johnson

(10) Patent No.: US 9,360,314 B2
(45) Date of Patent: Jun. 7, 2016

(54) SYSTEM AND METHOD FOR REMOTE-CONTROLLED LEVELING

(71) Applicant: Alan L. Johnson, Barrington, IL (US)

(72) Inventor: Alan L. Johnson, Barrington, IL (US)

( * ) Notice: Subject to any disclaimer, the term of this patent is extended or adjusted under 35 U.S.C. 154(b) by 232 days.

(21) Appl. No.: 14/046,977

(22) Filed: Oct. 6, 2013

(65) Prior Publication Data

US 2015/0096180 A1    Apr. 9, 2015

(51) Int. Cl.
| | |
|---|---|
| *G01C 9/02* | (2006.01) |
| *G01C 15/00* | (2006.01) |
| *G01S 17/42* | (2006.01) |
| *E02F 9/26* | (2006.01) |

(52) U.S. Cl.
CPC ... *G01C 9/02* (2013.01); *E02F 9/26* (2013.01); *G01C 15/004* (2013.01); *G01S 17/42* (2013.01)

(58) Field of Classification Search
CPC ............ E02F 3/842; E02F 3/847; E02F 9/26; E02F 9/261; E02F 9/262; E02F 9/263; E02F 9/264; G01C 9/06; G01C 15/002; G01C 15/004; G01S 17/42
USPC ....... 33/228, 264, 286, 293, DIG. 21; 37/348; 172/4.5, 1
See application file for complete search history.

(56) References Cited

U.S. PATENT DOCUMENTS

| | | | | |
|---|---|---|---|---|
| 3,426,146 A | * | 2/1969 | Seaman | E02F 3/842 172/4.5 |
| 3,813,181 A | * | 5/1974 | Barnes, III | E01C 19/004 172/430 |
| 4,035,621 A | * | 7/1977 | Kemp | G07C 5/0883 37/348 |
| 4,888,890 A | * | 12/1989 | Studebaker | E02F 3/437 33/263 |
| 5,375,663 A | * | 12/1994 | Teach | E02F 3/847 172/4.5 |
| 5,879,221 A | * | 3/1999 | Barton | A63H 17/12 446/427 |
| 7,066,276 B1 | * | 6/2006 | Wilcox | G01C 5/00 172/1 |
| 7,246,456 B2 | * | 7/2007 | Wray | A01B 69/008 172/4 |
| 7,758,399 B2 | * | 7/2010 | Weiss | A63H 17/00 235/462.03 |
| 7,814,670 B2 | * | 10/2010 | Katayama | G01C 5/00 172/4.5 |
| 8,125,529 B2 | * | 2/2012 | Skoskiewicz | G08G 1/04 348/116 |
| 2006/0218806 A1 | * | 10/2006 | Lyle | G01C 15/08 33/295 |
| 2007/0177133 A1 | * | 8/2007 | Cain | E02F 3/437 356/139.04 |

* cited by examiner

*Primary Examiner* — R. A. Smith
(74) *Attorney, Agent, or Firm* — Clifford H. Kraft

(57) ABSTRACT

A remotely controlled vehicle that can carry a laser detector or other survey equipment that can be wirelessly controlled from a piece of heavy equipment. A particular embodiment can be used to dig out level basements to a predetermined grade by placing a laser emitter on a support on the floor of the dig and maneuvering the remotely controlled vehicle carrying a laser detector from the cab of the digging equipment so that an entire basement dig can be dug out accurately level by a single person.

16 Claims, 3 Drawing Sheets

US 9,360,314 B2

SYSTEM AND METHOD FOR REMOTE-CONTROLLED LEVELING

BACKGROUND

1. Field of the Invention

The present invention relates generally to surveying and leveling and more particularly to a level or other survey device that can be controlled remotely to check compliance with a particular grade.

2. Description of the Prior Art

One of the major problems in earth-moving construction is to dig a hole with a flat bottom at a predetermined elevation (grade). For example when a back-hoe or other piece of large equipment is used to dig out a basement, swimming pool or other similar type of job, the result must be a level floor at exactly the right grade (height) to within a few fractions of an inch. Presently, a laser light emitter is mounted at the far rim of the hole that emits a level laser light beam. It is then necessary to send a person down into the hole to hold a pole with a laser detector or other height measuring instrument mounted on the top. The laser detector on the pole registers either high, low or level usually by a colored light, and up-down arrow and/or audible sound. A typical basement dig is shown in FIG. 1. A large excavator sits above the hole and digs toward itself. It is necessary for the laser detector on the pole to read level all over the bottom of the hold. Also, it is very undesirable to over-dig. Therefore, continuous height measurement of the flat bottom as digging progresses is essential.

The use of a human moving around the bottom of the dig presents a danger of an accident as well as the human possibly missing places or not holding the pole straight up and down. In addition, the present situation requires two people, both of which must be paid, or that the operator leave the excavator periodically, descend into the hole and make the measurement. It would be very advantageous to have a system and method that would 1) allow one person to complete the job alone, 2) provide a flat floor without the operator having to leave the digger, 3) minimize human error and danger.

In addition to digging basements and the like, there are many other survey and/or leveling type jobs that typically require two people. It would be advantageous to have a system and method that would allow one person to accurately complete these jobs. Some jobs are ideally suited for a remote-controlled survey unit such as paint spraying or other marking jobs, and digital straight line measurement for window wells and different features of construction.

SUMMARY OF THE INVENTION

The present invention provides a system and method where one person can dig out a basement or perform other precision digging jobs. A laser emitter is placed at the bottom of the hole on a flat surface at the beginning of the dig. The beam is height calibrated so that it is a known distance above the correct floor level. A laser detector, instead of being mounted on a pole, is rather mounted on a robot vehicle. The robot vehicle generally has four wheels with a low center of gravity, a wide axle and a good suspension and can be controlled remotely. Such vehicles are known in the art and can be purchased either as toys (remote-controlled miniature jeeps and the like) or simple as remote-controlled wheeled vehicles. The typical vehicle used with the present invention has 4-4 inch wheels and provides a moving platform that allows a laser height detector (survey level) to be securely mounted to the vehicle. The laser detector is typically rectangular or cylindrical and can detect the laser beam 360 degrees around. The vehicle can be turned and driven in any direction, typically both in forward and reverse. The remote controller for the vehicle can be mounted in the cab of the digging device or excavator where the equipment operator can operate it.

As the dig progresses, the equipment operator can maneuver the remote-controlled vehicle carrying the laser detector to any position in the hole he wants to measure. The laser-detecting level mounted on the vehicle typically signals a the correct grade (height) with a green LED or other light and an above-grade (or below-grade) condition with a red LED or other light. More sophisticated levels can transmit data wirelessly directly to the cab of the excavator, and/or record data if necessary. In this manner, the equipment operator can maneuver the remote vehicle to any part of the floor an immediately receive an indication of the grade at that point.

It is an object of the present invention to provide a system of method of digging to a grade by a single operator where that operator does not have to leave the cab of digging equipment.

It is also an object of the present invention to provide a remote-controlled survey device that can perform leveling tasks without using a hand level.

Finally, it is an object of the present invention to provide a remote-controlled vehicle that can carry a laser detector level or other survey equipment where it can be maneuvered to difficult-to-get-to locations.

DESCRIPTION OF THE FIGURES

The stated and unstated objects, features and advantages of the present inventions (sometimes used in the singular, but not excluding the plural) will become apparent from the following descriptions and drawings, wherein like reference numerals represent like elements in the various views, and in which.

Several drawings and illustrations have been presented to aid in understanding the present invention. The scope of the present invention is not limited to what is shown in the figures.

DETAILED DESCRIPTION OF THE PREFERRED EMBODIMENTS

The present invention relates to a remotely-controlled or robot vehicle system that can carry a laser detector level or other survey device into a dig or be used on any job that needs to be performed by a limited number of persons or by remote control.

Figure 1:
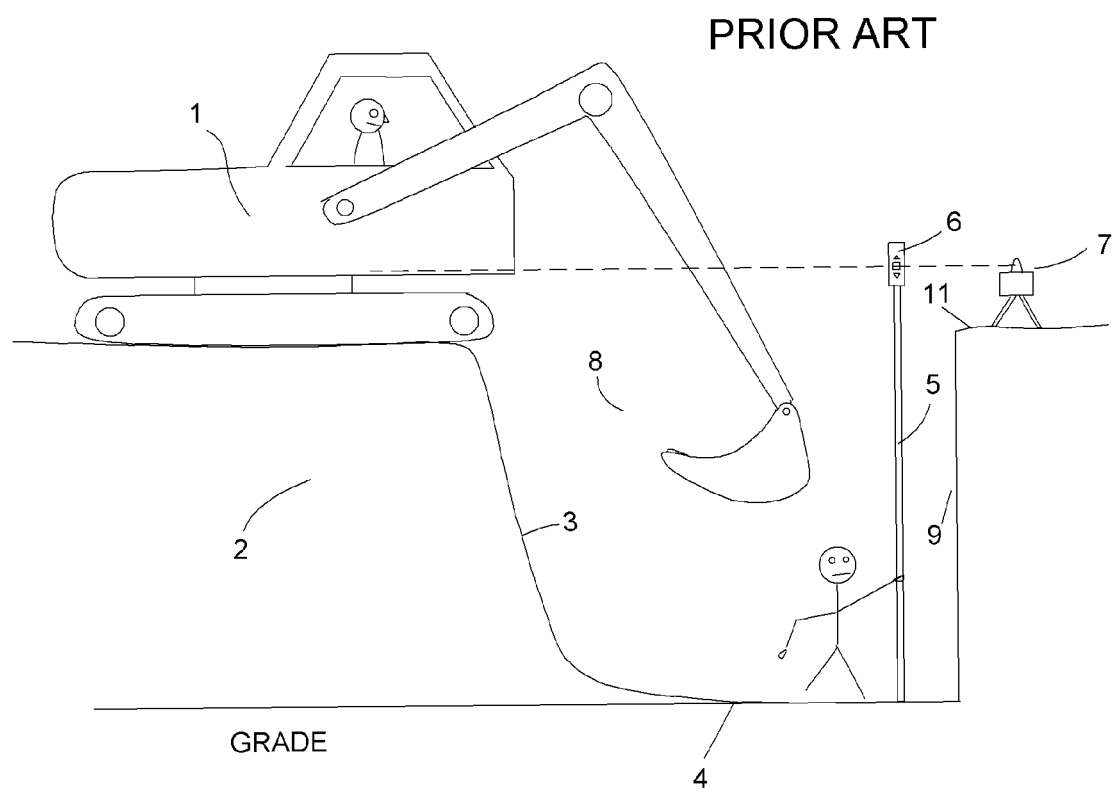
FIG. 1 shows the prior art situation of a human used to level a dig to grade.

Turning to FIG. 1, a prior art basement dig is depicted. A piece of heavy equipment (excavator) 1 is being used to dig out a basement 8 to a predetermined grade level 4. The dig starts at the right of FIG. 1 where an almost vertical wall 9 is dug down to grade. A laser emitter 7 is positioned at the rim of this vertical wall 11. The digging equipment 1 and equipment operator sits on top of the other rim of the dig on substantial earth 2 and digs out a sloping wall 3 as the digging moves backward (toward the left of FIG. 1). A worker or the equipment operator is sent to, or goes to, the bottom of the dig and holds a pole 5 with a laser detector level 6 mounted on its top. The laser detector 6 shows a red LED, or arrow with modulated beeping sounds when the floor is above grade and a green LED or a straight line with a steady beeping sound when the floor is exactly at grade. The worker is then instructed to move (or moves) to different locations in the dig to check for the correct grade. A typical vertical wall 9 can have a rim 11 from as little as several feet to as high as at least twenty-four feet. A ten to twelve foot basement is typical. In a typical dig, it is almost impossible to complete the dig efficiently without the second person (the worker). Otherwise, the equipment operator has to exit the equipment and descend down the steep slope 3 to the bottom of the dig to frequently check the grade. This prior art method is time-consuming, and creates a danger for the worker.

Figure 2:
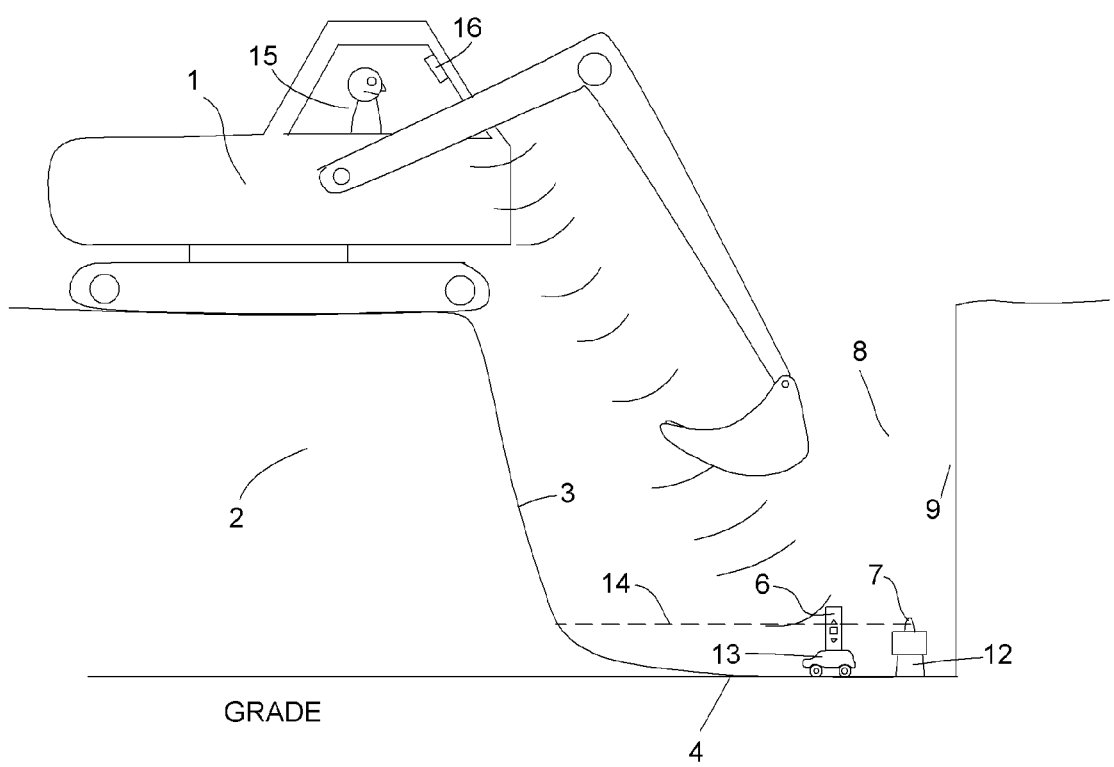
FIG. 2 shows a basement dig using an embodiment of the present invention.

FIG. 2 shows an embodiment of the present invention being used in the same basement dig as depicted in FIG. 1. Here, the equipment 1 is positioned the same as in FIG. 1, and the dig progresses in the same manner. However, in this case, the laser detector level 6 is placed on a remote-controlled vehicle 13 that can be maneuvered around the bottom of the dig. The laser emitter 7 is mounted on a support 12 that can be as simple as an inverted bucket, or could be a small set of legs. The laser beam 14 must intersect the laser detector 6 horizontally so that when the wheels of the vehicle 13 are on grade, the laser detector 6 shows a green LED. Laser emitters and detectors are easily set up for different heights.

As the dig progresses, the equipment operator 15 controls and maneuvers the vehicle 13 using a control unit 16 that can be temporarily or permanently mounted in the cab of the equipment 1. The operator 15 can move the vehicle to any position on the floor to check grade. If a location is too high, the operator 15 simple moves the vehicle 13 out of the way and digs that location in a manner identical to how it would be done if a human had made the measurement. The advantage is that a single operator 15 can complete a dig to exactly the correct grade in a very short time without help. At the end of the dig, the vehicle 13 can be maneuvered around the dig 8 to check all parts of the floor.

Figure 3:
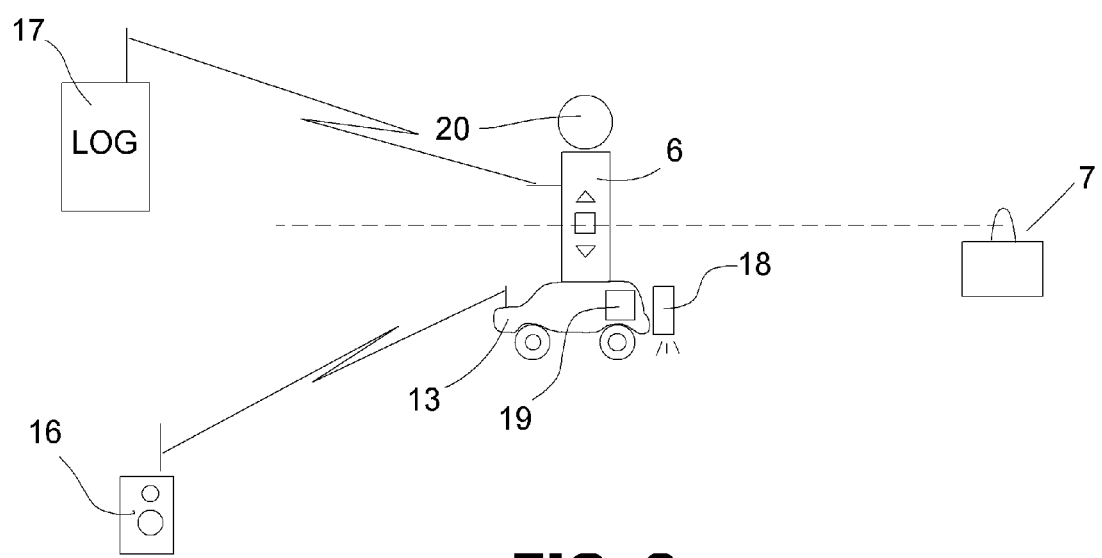
FIG. 3 shows a diagram of components used with embodiments of the present invention.

FIG. 3 shows a diagram of various parts of equipment used with the present invention. A remote-control unit 16 can be adapted to mount in the cab of a piece of heavy equipment with straps, a magnet or VELCRO™ or by any other mounting method. A laser detector 6 is mounted to a remote-controlled vehicle 13 such as a toy jeep or the like or any other remotely-controlled vehicle. The laser detector 6 typically has a 360 degree "look", and can detect the laser beam from an angle. A laser emitter 7 can be positioned to a correct height by placing it on a support of any type. The vehicle 13 is controlled wirelessly by the remote-control unit 16 as is known in the art. It can be driven over various terrain by the operator. In particular, it can be driven uphill and downhill as needed to check the work of the operator. An optional logger/recorder 17 can also be used to record a series of level or other measurements. An optional GPS 19 or other location-measuring instrument may be used to locate exact positions.

The remotely-controlled vehicle should typically have 4-wheel drive with independent suspension (each wheel independently suspended). This allows the vehicle to keep the laser detector generally upright as it moves over the floor of the dig. The vehicle's wheel base should be wide with extension axles if necessary, and its center of gravity should be low. The vehicle should also have fairly hard tires to prevent any spongy response from the tires. The battery for the laser detector is best mounted in the vehicle as low as possible, since that results in a lower center of gravity.

While a 4-wheel vehicle has been used in the preferred embodiment, the word vehicle or remotely-controlled vehicle used herein can mean any vehicle with any number of wheels, a vehicle with tracks instead of wheels or a simple ball or set of balls. In addition, vehicle or remotely-controlled vehicle could mean a flying or hovering device such as a remotely-controlled helicopter or aircraft.

In various preferred embodiments, the laser detector can be a unit like those made by Johnson Co. such as the model 40-6791. The laser emitter can also be a unit like rotary lasers made by Johnson Co. The remotely-controlled vehicle can be a remote-controlled jeep such as the Axial Rubicon Jeep. While these choices represent a preferred embodiment, any laser emitter and laser detector, or any other type of leveling or survey equipment, may be used and is within the scope of the present invention. Any vehicle of any type that can be remotely-controlled is within the scope of the present invention.

In addition to simply carrying a laser detector, the remote vehicle 13 can carry any other piece of survey equipment as needed.

The vehicle can be optionally equipped with roof-mounted warning lights 20 that come on during movement, lighting for turn-signals, brake lights and the like. In particular, the vehicle may be optionally equipped with marking equipment such as a remotely-controlled paint or marker spray 18 can to emit paint downward. This can be used by the operator to selectively mark window wells and other lines or to lay down, dots or dashes and the like to aid the operator in his work.

In some embodiments of the present invention, the laser detector 6 or other survey device can log measurements either to a local computer/memory device or wirelessly to a remote computer/memory device or other logging device.

An alternative embodiment can carry a GPS receiver or other type of position locating instrument. It can then log and/or report position back to either the operator or a computer. This is particularly useful when the device is used to perform an elevation survey. In this case, the vehicle carries both a laser detector level and a location-determining instrument such as a GPS receiver.

Several descriptions and illustrations have been presented to aid in understanding the present invention. One with skill in the art will realize that numerous changes and variations are possible without departing from the spirit of the invention. Each of these changes and variations is within the scope of the present invention.

I claim:

1. A method for digging out a hole with a piece of digging equipment to an exact grade level comprising:
    placing a laser emitter on a support near a desired grade level;
    placing a laser detector on a remotely-controlled vehicle with four wheels so that said laser detector indicates when said wheels are at the desired grade level; wherein, said remotely-controlled vehicle has a wide wheel-base with 4-wheel drive and independent suspension on each wheel;
    mounting a control unit for said remotely-controlled vehicle in said digging equipment in proximity to an equipment operator position;
    permitting an equipment operator to maneuver said remotely-controlled vehicle to any position in said hole to check for the desired grade level as digging progresses.

2. The method of claim 1 wherein said laser detector emits a green light signal when the wheels of said remotely-controlled vehicle are at said desired grade level.

3. The method of claim 1 wherein said laser detector emits a red light signal when the wheels of said remotely-controlled vehicle are not at said desired grade level.

4. The method of claim 1 further comprising mounting safety lights on said remotely-controlled vehicle that light when said vehicle is moving.

5. The method of claim 1 wherein said laser detector emits a first signal when the wheels of said remotely-controlled vehicle are at said desired grade level and a second signal when they are not.

6. A method for digging out a hole with a piece of digging equipment to an exact grade level comprising:
   placing a laser emitter on a support near a desired grade level;
   placing a laser detector and a GPS receiver on a 4-wheel remotely-controlled wide wheel-base vehicle so that said laser detector indicates when said vehicle is a predetermined height above the desired grade level;
   mounting a control unit for said remotely-controlled vehicle in said digging equipment in proximity to an equipment operator position;
   permitting an equipment operator to maneuver said remotely-controlled vehicle to any position in said hole to check for the desired grade level as digging progresses, said GPS receiver wirelessly reporting positions and elevations in said hole to a remote location.

7. The method of claim 6 wherein said laser detector emits a first signal when said remotely-controlled vehicle is at said predetermined height above the desired grade level and a second signal when said remotely-controlled vehicle is not at said predetermined height above the desired grade level.

8. The method of claim 7 wherein said first and second signals are light signals.

9. The method of claim 7 wherein said first and second signals are wirelessly communicated back to said control unit.

10. The method of claim 7 wherein said remotely controlled vehicle has independent suspension on each wheel.

11. A system for digging out a hole with a piece of digging equipment to an exact grade level comprising:
    a laser emitter adapted to be placed in the dig near a desired grade level;
    a laser detector mounted on a remotely controlled wide wheel-base, 4-wheel drive vehicle, wherein each wheel has independent suspension, said laser detector adapted to indicate when said remotely-controlled vehicle is at a predetermined height above said desired grade level;
    a control unit for said remotely controlled vehicle adapted to be mounted in a piece of digging equipment near an operator position;
    a GPS receiver mounted on said remotely controlled vehicle wirelessly reporting elevation to said operator position;
    whereby, an operator occupying said operator position can measure levels in said hole by maneuvering said remotely-controlled vehicle around said hole.

12. The system of claim 11 wherein said laser detector emits a first indication when said wheels are at the desired grade level and emits a second indication when they are not.

13. The system of claim 12 wherein said first indication is a green light and said second indication is a red light.

14. The system of claim 11 further comprising a logger adapted to record levels reported by said laser detector as said remotely-controlled vehicle is maneuvered in said hole.

15. The system of claim 11 wherein said laser detector displays a green light when the wheels of said remotely-controlled vehicle are at the desired grade level.

16. The system of claim 11 wherein said laser detector displays a red light when the wheels of said remotely-controlled vehicle are not at the desired grade level.

* * * * *